United States Patent [19]

Ponjeé et al.

[11] 4,116,535

[45] Sep. 26, 1978

[54] PICTURE DISPLAY CELL WITH MEMORY EFFECT

[75] Inventors: Johannes Jacobus Ponjeé; Jacob Bruinink, both of Eindhoven, Netherlands

[73] Assignee: U.S. Philips Corporation, New York, N.Y.

[21] Appl. No.: 736,485

[22] Filed: Oct. 28, 1976

[30] Foreign Application Priority Data

May 10, 1976 [NL] Netherlands ........................ 7604954
Oct. 12, 1976 [NL] Netherlands ........................ 7611240

[51] Int. Cl.² .................... G02F 1/23; G03G 16/00; C09K 3/00
[52] U.S. Cl. .................................. 350/355; 204/242; 252/408
[58] Field of Search .................. 204/242, 224 R; 350/160 R; 252/408 R, 300 P, 299; 96/1 R

[56] References Cited

U.S. PATENT DOCUMENTS 3,806,229  4/1974  Schoot et al. ................... 252/299 X
3,854,794  12/1974  Vandam et al. ................ 350/160 R
3,912,368  10/1975  Ponjee et al. ................ 204/224 R X
3,930,717  1/1976  McDermott et al. ........... 350/160 R
3,950,077  4/1976  Jasinski ........................... 350/160 R

*Primary Examiner*—John H. Mack
*Assistant Examiner*—D. R. Valentine
*Attorney, Agent, or Firm*—Frank R. Trifari; Norman N. Spain

[57] ABSTRACT

The invention relates to an image display cell in which a 4,4'-bipyridinium compound is used as a reduceable redox material. According to the invention said redox material is dissolved in a cell medium which contains a mixture of water and an electrochemically inert organic solvent. A suitable organic solvent is, for example, dimethyl sulfoxide. As a result crystallization of the solution takes place only at temperatures far below 0° C so that the picture display cell can also be used at lower temperatures. The 4,4'-bipyridinium compound may be so chosen that the resulting picture can be erased directly electrochemically without the use of an auxiliary couple.

6 Claims, 3 Drawing Figures

PICTURE DISPLAY CELL WITH MEMORY EFFECT

The invention relates to an image display cell having a memory comprising a housing having a transparent wall part as well as a reversible reduceable redox material which is present inside the housing and is dissolved in an electrochemically inert liquid which is in contact with at least two inert electrodes provided in the housing.

Such a cell is described in published Netherlands patent application No. 7,117,713 in the name of applicants. In this known cell, a colourless 4,4'-bipyridinium compound which is dissolved in water is used as a reversible reduceable redox material. When a voltage of at least 0.5 Volt is applied across the electrodes of the cell, the 4,4'-bipyridinium compound is reduced at the cathode by incorporation of an electron to a non-water-soluble or poorly water-soluble coloured compound which precipitates in the form of a film on the cathode (picture cathode). When the voltage is removed, the cathode picture formed by the coloured compound remains; thus the cell has memory. The picture is erased by reversing the polarity of the electrodes, in which the coloured material changes into the abovementioned colourless bipyridinium compound, which is dissolved, by giving off an electron. The coloured compound is again formed at the other electrode (counter electrode). The electrochemical process at both electrodes is based on electrochemical conversions of redox materials which belong to the same pair.

A cell of the type mentioned in the preamble is furthermore known from published Netherlands patent application No. 7,306,209, also in the name of applicants.

As a reduceable redox material there is used a 4,4'-bipyridinium salt, a dimer thereof or a polymeric bipyridinium compound. The material is dissolved in water. The redox material at the cathode is converted into a coloured non-water-soluble compound by incorporation of one electron per bipyridinium group, which compound precipitates on the cathode. The cell furthermore comprises an oxidizable redox material in the form of a readily water-soluble bromide which is converted at the anode, by giving off an electron, into bromine, the formed bromine complexing with a quaternary ammonium compound and precipitating on the anode. When the voltage is removed, the picture formed at the display electrode remains, the cell has memory.

By reversing the polarity of the voltage at the electrodes, the coloured compound at the picture electrode will change, by giving off an electron, into the water-soluble uncoloured material, while the coloured compound will be formed at the counter electrode. At both electrodes electrochemical conversions of redox materials belonging to the same pair occur. Electrochemical conversions also take place at the bromine-bromide redox system which serves as an auxiliary couple.

In both known image display cells having memories water is used as a solvent. This solvent satisfies a very particular physical-chemical criterion, namely on the one hand the reduceable redox material dissolves to a sufficient extent to achieve a rapid picture formation and on the other hand the coloured compound obtained from the reduceable redox material by incorporation of an electron is poorly soluble. Of course the phenomenon is essential to obtain a picture display cell with memory effect.

However, the solvent, water, has a very annoying drawback for practical application in a picture display cell namely that at temperatures lower than approximately 0° C., crystallization or freezing occurs, as a result of which the picture display cell is cracked as a result of the associated expansion. The practical application of the known picture display cell is thus very restricted.

The invention relates to an image display cell of the kind mentioned in the preamble which does not exhibit the abovementioned drawback. The invention relates more in particular to an image display cell with a memory comprising a housing having a transparent wall part as well as reversible reduceable redox material which is present inside the housing and is dissolved in an electrochemically inert liquid which is in contact with at least two inert electrodes provided in the housing, and is characterized in that the electrochemically inert liquid is a mixture of water and an electrochemically inert organic solvent in which a 4,4'-bipyridinium compound is dissolved as a reversible reduceable redox material and corresponds to the formula I

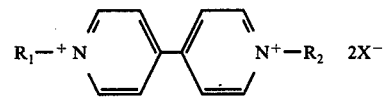

wherein $R_1$ and $R_2$ each represent an alkyl group having 4-8 carbon atoms and $X^-$ is a $ClO_4'$, $NO_3'$ $H_2PO_4'$ or BF4 group, or a bipyridinium dimeric compound which corresponds to the formula II

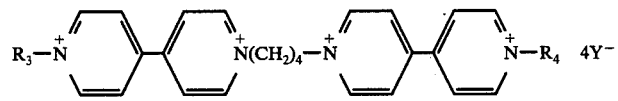

wherein $R_3$ and $R_4$ each represent an alkyl group having 1-4 carbon atoms or a benzyl group which may be substituted with an electrochemically inert substituent, and $Y^-$ is a $ClO_4'$, $BF_4'$, $H_2PO_4'$ or $PF_6'$ group, or a bipyridinium polymeric compound which is obtained by reacting 4,4'-bipyridyl and $\alpha, \omega$ dibromobutane in a polar aprotic solvent and then replacing the bromide anion by a $ClO_4'$ ion $H_2PO_4'$—, or $BF_4'$ ion according to a known method.

The term "electrochemically inert" is to be understood to mean electrochemically stable within the voltage range used. The value of said voltage range, that is the voltage difference between anode and cathode, in the cell according to the invention is at most 3 Volts. Electrochemically organic inert solvents are well known from literature in particular by the English name of "non-aqueous solvents for electrochemical use", for example, from Electr. Anal. Chem 3, pages 57 et seq.

Good results are obtained with organic sulfoxides, amides, ketones, carboxylic acids, nitriles and the like. This applies notably to a picture display cell according to the invention in which the electrochemically inert liquid from 10 to 90% by volume of an organic solvent selected from the group consisting of dimethyl sulfoxide, dimethyl formamide, dimethyl acetamide, N-alkylformamide, formamide, N-alkyl acetamide, hexamethylene phosphoramide, tetrahydrofuran, acetonitrile, lower aliphatic carboxylic acid, alkylene carbonate, sulfolan and acetone and the remainder water.

The structure of the bipyridinium polymeric compound is not known. It proved impossible with the present day technics to determine the molecular weight of the reaction product. Probably the structure of a part of the reaction product can be represented by the formula III

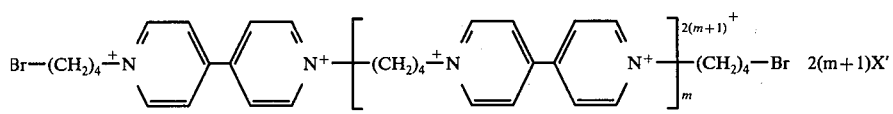

wherein X' is a $ClO_4'$, $H_2PO_4'$ or $BF_4'$ ion. In determining the value for $m$, such high values were found that it may be assumed that a part of the polymeric reaction product consists of compounds having a cyclic structure. The conversion of the initially obtained bipyridinium polymeric bromide into the corresponding perchlorate compound dihydrogenphosphate- or borotetrafluoride compound can be carried out according to known methods, for example, by means of salting out. For this purpose the bipyridinium polymeric bromide is dissolved in a suitable solvent, for example water, and a large quantity of a readily soluble perchlorate, dihydrogenphosphate or borotetrafluoride, for example $NaClO_4$ $NaH_2PO_4$ or $NaBF_4$, is then added to it. The desired bipyridinium polymeric perchlorate or borotetrafluoride precipitates from the solution.

When $R_3$ or $R_4$ in the abovementioned formula II represents a substituted benzyl group, the substituent present at the benzyl group is preferably selected from the group consisting of a fluorine atom, a chlorine atom a lower alkyl group having 1-4 C-atoms and a lower alkoxy group having 1-4 C-atoms.

The picture display cell according to the invention has the important advantage for practical applications that in the cell medium, that is the electrochemically inert liquid with constituents dissolved therein, crystallization of medium or constituents, such as formation of ice crystals, takes place only at temperatures far below 0° C. The value of the temperature at which crystallization takes place depends on several factors, such as the type and the concentration of the organic solvent used.

In a favourable embodiment of the display cell according to the invention the electrochemically inert liquid also comprises a salt dissolved therein and the anion of which is identical to the anion of the reversible reduceable redox material present in the display cell.

Examples of such salts are, for example, $LiClO_4$, $NaClO_4$, $NaH_2PO_4$ $NaNO_3$ and $NaBF_4$. The quantity of salt may vary between 0 and 60 g per 100 ml of cell liquid.

The result of such a salt addition is that the solubility product of the bipyridinium radical salt is reached at a lower concentration of the bipyridinium radical ion. This means in practice that by the addition of salt the quantity of organic solvent used can be increased, which results in a further depression of the freezing point.

By a suitable choice of the organic solvent, the concentration thereof, and the quantity of added salt, those skilled in the art can easily prepare a cell medium the crystal temperature of which is lower than minus 30° C. The crystalization temperature in accordance with the quantity of organic solvent used is shown diagrammatically, by way of example, in FIG. 1 of the drawing.

The following method may be used for making the image display cell according to the invention. A housing having a transparent wall part as shown in the drawing at the end of the specification and explained by the examples, is provided with the desired number of electrodes, at least two, and filled with a solution of the reversible reduceable redox material, as defined above, in a mixture of water and electrochemically inert solvent. The concentration of the reversible reduceable redox material is at least $10^{-2}$ molar and is generally 0.02–0.05 molar. A voltage of approximately 3 Volts is then set up across the electrodes. At the cathode the reduceable redox material, hereinafter referred to as reduceable viologen salt or reduceable bipyridinium salt, is converted by the incorporation of an electron into a violet-coloured radical salt which dissolves very poorly in the reaction medium and precipitates on the cathode in the form of a film. When the reduceable viologen salt contains several bipyridinium groups, several electrodes corresponding to the number of bipyridinium groups will be incorporated at the cathode, a violet-coloured viologen-radical salt insoluble in the cell medium being also formed and also precipitating as a film on the cathode. The electrochemical reductions of the reduceable redox system occurring may be explained by means of the following equations:

(a) reaction equation upon reduction of redox material according to formula I

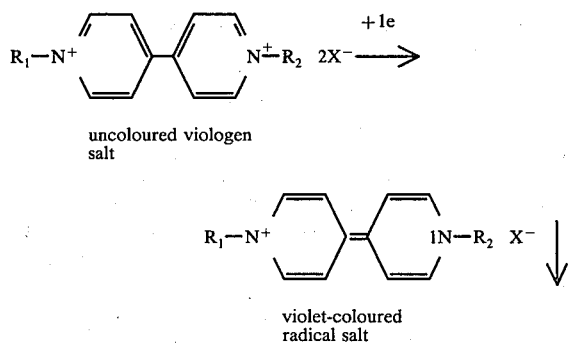

uncoloured viologen salt violet-coloured radical salt (b) Reaction equation upon reduction of redox material according to formula II

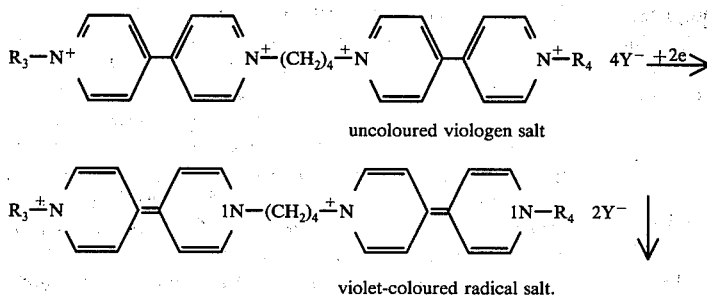
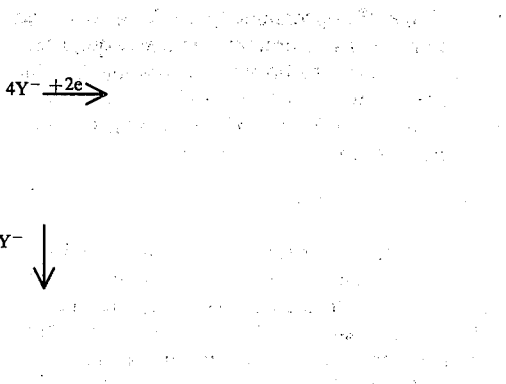

uncoloured viologen salt violet-coloured radical salt.

The above-mentioned bipyridinium polymeric compound will be reduced in a corresponding manner to the insoluble violet-coloured polymeric radical salt, the bipyridinium groups being converted in an identical manner as shown in the above equations.

The above-mentioned reduction, taking place at the cathode, of the uncolored viologen salt into the colored viologen radical salt occurs when a voltage of at least 300 mV (negative) with respect to a $H_2$-electrode is set up at the cathode. With respect to the standard calomel electrode the minimum voltage difference is 500 mV negative. In order to obtain a picture on the cathode (picture electrode) sufficiently rapidly, it is desired to set up a slightly higher negative voltage at the cathode. In practice the voltage difference over the assembly of anode-medium-cathode will be at most 2,5 to 3 V.

The speed of the picture formation on the cathode of course also depends considerably upon the concentration of the dissolved reduceable viologen compound. The solubility of the reduceable redox material used in the display cell according to the invention in the mixture of water and organic solvent is at least $10^{-2}$ molar, which effects a sufficiently rapid picture formation. The solubility of the redox material used in the cell medium of the picture display cell according to the present invention is larger than that of the redox material used in the above-mentioned known display cells which is dissolved in water. This means a further advantage of the present picture display cell with respect to the known picture display cell. In the picture display cell according to the invention, as a matter of fact, a larger group of viologens may be used in a usually larger concentration due to the better solubility.

Surprisingly, in spite of the better solubility of the reduceable viologen salt, the coloured viologen radical salt formed at the cathode is insoluble in the cell medium.

The combination of a reduceable viologen salt which is readily soluble in the cell medium and a viologen-radical salt which is insoluble in the medium is essential for a picture display cell with memory effect and depends on the anion present in the salt. Such an influence of the anion is deemed to be very special, which can best be explained as follows with reference to an example. Experiments have demonstrated that N,N'-diheptyl-4,4'-bipyridinium-bromide dissolves readily in water and upon reduction forms a coloured film of insoluble radical salt at the cathode. When 20% by volume of dimethyl sulphoxide are added to the medium which consists of water, then the solubility of the above viologen bromide is still excellent but no film of the radical salt can be obtained at the cathode by reduction. The radical salt also dissolves in the cell medium.

When instead of the bromide the corresponding perchlorate is used (see definition of $X^-$ in formula I), a very good solubility of said viologen perchlorate is found in a mixture of water and 20% by volume of dimethyl sulphoxide. Very surprisingly, however, upon reduction of the viologen perchlorate, a stable film of the corresponding viologen radical perchlorate which is insoluble in the cell medium is formed at the cathode.

The above discussion relates the reactions at the cathode occurring upon manufacturing a picture display cell according to the invention. An electrochemical oxidation process must take place simultaneously at the anode in which electrons are given off to the anode. For this purpose several systems are possible.

When no special measures are taken, an undefined electrochemical process occurs at the anode in which either the contaminations possibly present in the medium, for example Cl-ions, are oxidized to $Cl_2$ while giving off electrons, or hydroxyl ions are oxidized to oxygen with decomposition of the water present.

It is alternatively possible to provide an auxiliary electrode in the cell medium, for example, a calomel electrode, and then to set up a voltage difference of a few volts across the calomel electrode and one of the cell electrodes, the auxiliary electrode serving as an anode. A film of insoluble coloured viologen radical salt is formed at the connected cell electrode. As soon as sufficient contrast with the cell liquid has been reached, thus as soon as the electrode has been provided sufficiently with the coloured viologen radical salt, the auxiliary elektrode is removed and the picture display cell is ready for use.

Another possibility of making the image display cell of to the invention ready for use is the application of a cell electrode which is already covered with a layer or film of the viologen radical salt. Such an electrode can be obtained, for example, by electrolyzing a solution of the reduceable viologen salt in a mixture of water and organic solvent, the desired viologen radical salt being deposited on the cathode. The anode process can be carried out by dissolving in the electrolysis liquid an oxidizable compound such as a ferro salt. The electrode thus treated together with an untreated electrode are incorporated in the housing of the image display device which furthermore comprises a solution of the reduceable viologen salt. The picture display cell according to the invention is ready for use.

In a favourable embodiment of an image display cell according to the invention an extremely attractive anode starting process can be carried out for making the cell ready for use. This preferred embodiment of the display cell is characterized in that a small quantity of a bromide is also dissolved in the electrochemically inert liquid.

When a voltage of approximately 2.8 Volts is set up across the electrode of said preferred image display cell, the bromide is oxidized to bromine at the anode. The resulting $Br_2$ reacts with $Br^-$ ions and the reduceable viologen ions present in the cell while forming a precipitate according to the reaction equation $$2Br^- + V^{2+} + 2Br_2 \rightarrow V(Br_3)_2 \downarrow$$

In this equation, $V^{2+}$ means a reduceable viologen (bipyridinium) ion. Thus there occurs readily defined process in which the formed oxidation agents, in this case $Br_2$, have been made harmless by precipitation, that is to say they no longer play a part in the electrochemical processes of the cell. The advantage of this is that the film of insoluble violet-coloured viologen radical salt formed at the cathode cannot be broken down by the oxidation agents formed in the anode starting process. As already said the quantity of bromide need only be small and is, for example, 0.0001-0.001 molar.

Bromides which can readily be used are, for example, the alkali metal bromides.

When using the image display cell of to the invention the film of viologen radical present on the picture electrode is erased by reversing the polarity of the voltage so that the picture electrode operates as an anode and the viologen radical salt changes into the soluble viologen salt by giving off of an electron. At the counter electrode, now serving as a cathode, the viologen salt dissolved in the cell medium is converted into the insoluble violet-coloured viologen radical salt which precipitates on said counter electrode. So in this case the electrochemical conversions at the cathode and anode are related to the same viologen redox couple. It is also possible in the cell according to the invention to use besides the viologen redox couple a second redox couple (so-called auxiliary couple), for example, ferri-ferro couple or bromine-bromide couple.

Numerous investigations performed by Applications have demonstrated that in particular the physical quality in particular the physical stability of the precipitate of the viologen radical salt formed on the picture electrode is of decisive importance for the erasing behaviour of the film. Experiments with the above described known display cells in which water is used as a solvent have demonstrated that in many cases it is not possible to erase the formed precipitate film completely electrochemically. In particular when the formed film is to be maintained for some time it has not been possible to electrochemically oxidize the entire film. Upon reversing the polarity of the voltage the film formed at the picture electrode no longer dissolves entirely. Initially this is not visible but in the long run the electrode will demonstrate a permanent and ever increasing discolouring so that the required contrast difference upon recording information decreases constantly so that the image display cell becomes useless.

In order to avoid this, the electrochemically non-erasable remainders of the film should be removed differently, for example, by a chemical oxidation process, in which the oxidation agent formed at the anode reacts with the remainders of the film of the viologen radical salt. For this purpose, the known cell usually has an auxiliary couple, for example, $Br_2/Br^-$ or $Fe^{+++}/Fe^{++}$. When no auxiliary couple is used, the voltage of the cell will have to be increased to such an extent that oxygen is formed at the anode which then ensures oxidation of the remainders of the film. Actually, water is the auxiliary couple in this case.

The control of an image display cell in which necessarily a chemical oxidation process is also used, is rather critical because just sufficient oxidation agent has to be formed anodically in order to dissolve the remainder of viologen radical salt entirely. In addition, the oxidation agent must just be present directly in those places where remainders of film are present, which additionally impedes the control. Thus there is a fair chance that in such a picture display cell an excess of oxidation agent will be formed in the long run so that the cell becomes useless.

Applicants have found that the erasing behaviour of a film of viologen radical salt formed at the picture electrode, in which the film can no longer be erased entirely electrochemically, is caused by a change in structure of the film which often occurs already within one or a few seconds after the formation of the film. The change in structure which in some cases can even be observed with the naked eye is probably based on a reorientation or recrystallization of the molecules as a result of which the layer can no longer be reached entirely electrochemically from the picture electrode.

It has surprisingly been found that in a highly preferred embodiment of the picture display cell according to the invention the film of viologen radical salt formed on the picture electrode can be erased entirely electrochemically. The use of an auxiliary couple or the formation of oxidation agents, for example $O_2$, is not necessary. The formed film does not orientate and can be reached electrochemically from the picture electrode.

This particular embodiment of the image display cell according to the present invention is characterized in that the reversible reduceable material is a compound which corresponds to the above-mentioned formula I in which $R_1$ and $R_2$ are an alkyl group having 5 to 8 carbon atoms and $X^-$ is a nitrate ion or corresponds to the above-mentioned formula II in which $R_3$ and $R_4$ are an alkyl group having 1 to 4 carbon atoms and $Y^-$ is a perchlorate ion, a hexafluorophosphate ion dihydrogenphosphate ion or a borotetrafluoride ion.

The favourable characteristics of this preferred embodiment of the image display cell according to the invention are recorded in the form of tables of the embodiments incorporated at the end of the description.

The image display cell according to the invention has a housing with at least one transparent wall or transparent wall part. It may be constructed from synthetic resins, glass, and the like.

The electrodes are preferably made from tin oxide. Indium oxide may alternatively be used.

The electrode may be constructed in all kinds of forms. It is alternatively possible to use several anodes and/or cathodes.

The formed picture may be uniform at the surface of the picture electrodes, or at the visible part of said surface. If a transparent electrode is used as a picture electrode, it may be provided on the inside on the transparent wall of the housing. The electrode may be coated partially with an electrically non-conductive material, for example a synthetic resin, so that the picture will be uniform at the non-coated part of the electrode surface. It is alternatively possible to screen the wall of the cell partly with a non-transparent mask on the outside, so that the formed picture is uniform at the visible part of the picture electrode.

The picture electrode may alternatively be arranged against the rear wall of the housing so that the picture is observed via the transparent wall and the cell liquid. However, it is not necessary for the picture electrode to be arranged against a wall of the housing; the electrode may also be provided elsewhere, provided it be surrounded by the cell liquid. In that case it may be recommendable to coat the electrode on the rear side with an electrically non-conductive material.

If the picture is to be observed from two directions, the arrangement of the picture electrode inside the cell may have advantages because — in the case of a flat electrode — a picture is formed on both sides. The position of the anode with respect to the cathode may be chosen arbitrarily. For example, the anode may be arranged at an angle of 90° with the cathode or be situated in a flat plane thereto. This also enables such an arrangement of the electrode that the colour which upon erasing the picture is formed on the counter electrode cannot be observed.

Although above a picture has been considered which is uniform to (the visible part of) the picture electrode, the picture may of course also be constructed from a number of components which are provided by the same number of actuated picture electrodes of the cell.

If the picture electrode(s) is (are) provided against a transparent wall of the cell, the contrast of the picture can be increased, if desired, by dispersing an insoluble, for example white, material in the cell liquid. As such may be mentioned inter alia titanium oxide and barium sulphate. These materials may also be used to conceal the electrodes other than the picture electrode(s). For the same purpose, a screen may be arranged in the cell, for example, of porous or perforated ceramic.

In addition to displaying pictures, the cell according to the invention may also be used as a voltage indicator. If a voltage is set up or has been set up across the electrodes which was larger than the minimum required voltage of approximately 0.5 Volt required to actuate the cell, colour is observed on the picture electrode.

However, it is possible to observe a signal in another manner than optically. Since upon forming colour the surface of the electrode is covered with viologen radical, the potential of the electrode with respect to the cell liquid varies therewith. Said potential variation can be observed by means of a reference electrode.

Also if the quantity of electric charge which has flowed through the cell is not sufficient to form a quantity of dye such that this can be observed optically, the potential variation of the electrode with respect to the cell liquid can already be observed with a reference electrode.

Hence the cell may be used as a means to establish that a voltage has been set up across the electrodes as a result of which a small quantity of charge has flowed through the cell, in other words, the cell may be used as a memory element. It will be obvious that, it the cell is used in this manner, the transparent wall portion of the cell need not be optically transparent.

Reference electrodes may be manufactured from the same materials as the picture electrodes, but glass electrodes, calomel electrodes and the like may also be used.

Reference electrodes may also be used to minimize the time which is necessary to form the picture. When a comparatively high potential difference is set up across a cathode and an anode of a cell, the viologen will very rapidly be reduced in the proximity of the cathode. The further increase of the quantity of reduced viologen on the cathode will then be determined by the velocity with which viologen is transported from the medium to the cathode. However, side reactions may then occur, for example the formation of hydrogen, which is undesired.

In order to prevent this, the potential difference across the electrodes is chosen to be so that sufficient viologen can always diffuse to the cathode. The velocity with which initially dye is formed on the cathode is lower than in the first case.

When a reference electrode is used which is arranged in the proximity of the cathode, the advantage of a rapid reaction as a result of a large potential difference can be combined with the advantage of the use of a smaller potential difference so that side reactions are prevented. The potential difference across cathode and reference electrode which occurs when a potential difference is applied across the cathode and the anode, can be compared continuously with a potential difference which is lower than or equal to the maximum permissible potential difference between the cathode and the reference electrode. If, for example, the measured potential difference is larger, the potential difference across the cathode and the anode can be reduced to such an extent that the desired potential difference across the cathode and reference electrode is reached. If desired, an electrolyte may be added to the cell liquid so as to increase the conductivity. For this purpose is preferably used an alkaline metal, an alkaline earth metal or tetraalkyl ammonium salt. The anion of said salt may of course not form an insoluble salt with the viologen cation. As a rule the cell liquid does not contain more than 2 grammol of salt per liter.

The image display cell is generally operated at a potential difference across the picture electrode and counter electrode of 0.5 to 3 Volts. As a rule a potential difference of 2.5 to 3 Volts is applied.

A visually observable picture can as a rule be obtained already in approximately 0.01 sec.

The concentration the the viologen in the cell liquid will as a rule be between 0.01 to 0.2 equivalents/liter. An equivalent viologen is to be understood to mean in this connection that quantity of viologen which contains the same number of bipyridyl groups as a mol bipyridyl. The compound according to formulae I and II are known for the greater part from J. Gen. Physiol 16, page 859 (1933), British Patent Specification No. 1,054,397 and Netherlands Patent Application No. 7,306,209. Compounds of formula I can be obtained by coupling bipyridyl according to a Menskhutkin reaction with a halide (J. Gen. Physiol 16, page 859 (1933) and converting the resulting halide into other salts according to a known and simple process. Such a replacement of anions can be realized, for example, by the above mentioned salting out. It is alternatively possible to convert the bipyridinium halide by the addition of silver sulphate into the corresponding bipyridinium sulphate and converting same by the addition of, for example $Ba(NO_3)_2$ or $Ba(ClO_4)_2$ into the bipyridinium nitrate and bipyridinium perchlorate, respectively. In a corresponding manner, bipyridinium dimer (formula II) or bipyridinium polymer compounds can be converted. For example, starting from a bipyridinium dimer bromide the corresponding perchlorate salt, dihydrogen phosphate salt, borotetrafluoride salt or phosphor hexa fluoride salt can be prepared by salting out in water by means of $LiClO_4$, $NaH_2PO_4$, $NaBF_4$ and $NH_4PF_6$, respectively.

The invention will be described in greater detail with reference to the following examples and drawing, FIG. 1 which is a curve showing the relation of crystallization temperatures to concentration of organic solvent of a cell medium of the invention, FIG. 2 which is a cross-sectional view of an image display cell of the invention and FIG. 3 which is a plan view of a picture electrode used in a cell of the invention.

EXAMPLE I

A glass cavette of which two oppositely located walls were provided on the inside with a $SnO_2$-electrode were rinsed with nitrogen for 24 hours. The surface area of each electrode was 1.5 cm$^2$, the distance of the electrodes 1 cm. The resistance per square of the $SnO_2$-electrodes was 10 Phm. The cell was filled with an oxygen-poor solution of a viologen salt as stated in column 1 of the Table hereinafter. The cell medium used is a mixture of water with an electrochemically inert organic solvent. The solvent is shown in column 2 of the Table, the mixing ratio is recorded in column 3 of said Table. From the Table (colums 1, 2 and 3) it may be read that the compounds are generally tested in various mixing ratios water-organic solvents. With higher mixing rations in favour of the organic solvent a readily soluble salt of which the anion corresponds to that of the viologen compound is added in the cell medium, if necessary. Herewith it is achieved that due to the favourable mixing ratio the freezing point reduction is optimum and furthermore no extra conductivity salt need be added. The higher anion concentration makes that in the equilibrium state the cation concentration of the reduced viologen radical salt based on the solubility product is smaller. Said cation concentration is such that no visually observable colouring of the solution takes place. The quantity used of the readily soluble salt is stated in column 4. If necessary, the cell also contains salt which increases the conductivity, for example $NaH_2PO_4$ and $NaNO_3$. In behalf of the starting of the picture display cell thus filled, a little NaBr, approximately 0.001 molar, is added to the cell medium. The cell was started by applying a direct voltage of 2.5 Volt across the electrodes for 250 m.sec. The picture electrode (mow cathode) was coloured violet in that the viologen radical salt precipitated on it in the form of a film. The quality of the formed precipitate film is stated in column 5. In this column, the indication "++" means a maximum quality in which the film after removing the voltage, so during the memory time, remains homogeneous in colour. No differently coloured spots; no contraction of any part of the formed film. The indication "+ −" means that the film after removing the voltage was maintained; so does not dissolve, but does show a few changes, for example colour difference expressed in, for example, the occurrence of differently coloured dots or in a homogeneous, often very small, colour variation.

Bromine was formed at the counter electrode, anode, by oxidation from bromide, which bromine was withdrawn from the cell medium in the form of a precipitate of formula $V(Br_3)_2$, wherein V is bipyridinium ion. The voltage level necessary upon erasing depends upon the erasing behaviour of the film which is indicated in column 6 of the Table. An erasing behaviour characterized by the indication "++" means that the film present on the picture electrode is erased at a voltage of 500 mV. So in this case there is a so-called "erasing on the layer". The film of viologen radical salts is and remains electrochemically achievable and upon inverting the said voltage is erased entirely electrochemically without the use of an auxiliary couple.

The indication "+ −" means that the film could not be erased exclusively on the layer but that an auxiliary couple was used to chemically oxidize the remaining parts of the viologen radical salt. This auxiliary couple is in casu a Br/Br' couple. The voltage level used then is approximately equal to 2.5 V. For clarity it is to be noted that an erasing behaviour denoted by "++" means that the cell, after having been started with a voltage of 2.5V, can be operated with 500mV voltage for its further life, thus requiring little power. Consequently, small-size batteries can be used, which is of advantage in using the image display cell according to the invention in small instruments, such as watches.

TABLE

A. Added viologen salt corresponds to formula

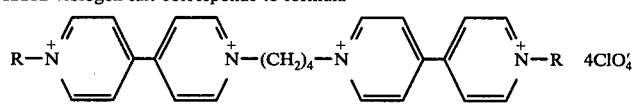

concentration 0.025 molar

| Substituent R | Solvent (org.) | Vol. ratio org. solvent and water | Added $LiClO_4$ in wt.% | Film quality | Erasing behaviour |
|---|---|---|---|---|---|
| $C_2H_5$ | dimethyl sulphoxide | 2:3 | 0 | ++ | ++ |
| $C_2H_5$ | dimethyl sulphoxide | 1:0 | 50 | ++ | ++ |
| $C_2H_5$ | dimethyl formamide | 1:4 | 0 | ++ | ++ |
| $C_2H_5$ | dimethyl formamide | 3:7 | 10 | ++ | ++ |
| $C_2H_5$ | dimethyl formamide | 7:3 | 25 | ++ | ++ |
| $C_2H_5$ | dimethyl acetamide | 1:4 | 0 | ++ | ++ |
| $C_2H_5$ | dimethyl acetamide | 2:3 | 5 | ++ | ++ |
| $C_2H_5$ | dimethyl acetamide | 3:2 | 25 | ++ | ++ |
| $C_2H_5$ | N-methyl formamide | 3:7 | 0 | ++ | ++ |
| $C_2H_5$ | N-methyl | | | | |

TABLE -continued

| | | | | | |
|---|---|---|---|---|---|
| | formamide | 3:2 | 10 | ++ | +− |
| $C_2H_5$ | formamide | 1:1 | 0 | ++ | ++ |
| $C_2H_5$ | formamide | 9:1 | 40 | ++ | ++ |
| $C_2H_5$ | N-methyl acetamide | 2:3 | 0 | ++ | ++ |
| $C_2H_5$ | N-methyl acetamide | 1:1 | 10 | ++ | ++ |
| $C_2H_5$ | hexamethylene phosphoramide | 2:3 | 0 | ++ | ++ |
| $C_2H_5$ | hexamethylene phosphoramide | 1:1 | 5 | ++ | +− |
| $C_2H_5$ | acetone | 1:1 | 0 | ++ | ++ |
| $C_2H_5$ | acetone | 7:3 | 10 | ++ | ++ |
| $C_2H_5$ | sulfolan | 3:7 | 0 | ++ | ++ |
| $C_2H_5$ | sulfolan | 2:3 | 10 | ++ | ++ |
| $C_2H_5$ | sulfolan | 1:1 | 25 | ++ | ++ |
| $C_2H_5$ | acetonitrile | 1:4 | 20 | ++ | ++ |
| $C_2H_5$ | acetonitrile | 2:3 | 40 | ++ | ++ |
| $C_2H_5$ | propylene carbonate | 1:4 | 20 | ++ | +− |
| $C_2H_5$ | acetic acid | 1:4 | 0 | ++ | ++ |
| $C_2H_5$ | acetic acid | 1:4 | 0 | ++ | ++ |
| $C_2H_5$ | acetic acid | 2:3 | 0 | ++ | ++ |
| $C_2H_5$ | formic acid | 1:1 | 0 | ++ | ++ |
| $C_2H_5$ | formic acid | 1:1 | 0 | ++ | ++ |
| $CH_3$ | dimethyl sulphoxide | 1:4 | 0 | ++ | ++ |
| $CH_3$ | dimethyl sulphoxide | 3:4 | 20 | ++ | ++ |
| $C_3H_7$ | dimethyl sulphoxide | 1:4 | 0 | ++ | ++ |
| $C_3H_7$ | dimethyl sulphoxide | 2:1 | 30 | ++ | ++ |
| $C_4H_9$ | dimethyl sulphoxide | 1:4 | 0 | ++ | ++ |
| $C_4H_9$ | formamide | 1:4 | 0 | ++ | ++ |
| $C_4H_9$ | formamide | 1:2 | 10 | ++ | ++ |

B. Viologen salt used corresponds to the formula

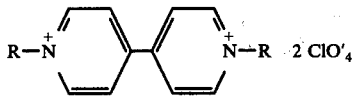

$$R-\overset{+}{N}\underset{}{\diagup\hspace{-0.3em}\diagdown}\underset{}{\diagdown\hspace{-0.3em}\diagup}\overset{+}{N}-R \quad 2\,ClO_4'$$

concentration $5 \times 10^{-2}$ molar

| Substituent R | Solvent | vol. ratio solvent and water | Added $LiClO_4$ in wt.% | Film quality | Erasing behaviour |
|---|---|---|---|---|---|
| $-C_4H_9$ | dimethyl sulphoxide | 1:4 | 0 | +− | +− |
| $-C_4H_9$ | " | 2:3 | 30 | ++ | +− |
| $-C_5H_{11}$ | " | 1:4 | 0 | +− | +− |
| $-C_5H_{11}$ | " | 3:2 | 3 | ++ | +− |
| $-C_6H_{13}$ | " | 1:4 | 0 | ++ | ++ |
| $-C_7H_{15}$ | " | 1:3 | 0 | ++ | +− |
| $-C_4H_9$ | dimethyl formide | 1:4 | 10 | ++ | +− |
| $-C_5H_{11}$ | " | 1:4 | 0 | ++ | +− |
| $-C_5H_{11}$ | " | 1:1 | 25 | ++ | +− |
| $-C_6H_{13}$ | " | 1:4 | 0 | ++ | +− |
| $-C_6H_{13}$ | " | 3:2 | 25 | ++ | +− |
| $-C_7H_{15}$ | " | 1:3 | | ++ | +− |
| $-C_7H_{15}$ | " | 7:3 | 20 | ++ | +− |
| $-C_8H_{17}$ | " | 2:3 | 0 | ++ | +− |
| $-C_8H_{17}$ | " | 4:1 | 20 | ++ | +− |
| $-C_4H_9$ | dimethyl acetamide | 2:3 | 30 | ++ | +− |
| $-C_5H_{11}$ | " | 1:4 | 0 | ++ | ++ |
| $-C_5H_{11}$ | " | 3:2 | 10 | ++ | +− |
| $-C_6H_{13}$ | " | 1:4 | 0 | ++ | +− |
| $-C_6H_{13}$ | " | 7:3 | 30 | ++ | +− |
| $-C_7H_{15}$ | " | 1:3 | 0 | ++ | +− |
| $-C_7H_{15}$ | " | 4:1 | 30 | ++ | +− |
| $-C_8H_{17}$ | " | 2:3 | 0 | ++ | +− |
| $-C_8H_{17}$ | " | 4:1 | 20 | ++ | +− |
| $-C_4H_9$ | N-methyl formamide | 1:4 | 10 | ++ | +− |
| $-C_4H_9$ | " | 2:3 | 15 | ++ | +− |
| $-C_5H_{11}$ | " | 1:4 | 0 | ++ | +− |
| $-C_5H_{11}$ | " | 1:1 | 15 | ++ | +− |

| Substituent R | Solvent | Vol. ratio org. solvent and water | Added $LiClO_4$ in wt./vol.% | Film quality | Erasing behaviour |
|---|---|---|---|---|---|
| $-C_6H_{13}$ | N-methyl formamide | 1:4 | | ++ | +− |
| $-C_6H_{13}$ | " | 4:1 | 20 | ++ | +− |
| $-C_7H_{15}$ | " | 1:3 | 0 | ++ | ++ |
| $-C_7H_{15}$ | " | 3:2 | 15 | ++ | +− |
| $-C_8H_{17}$ | " | 2:3 | 0 | ++ | ++ |

TABLE -continued

| Substituent R | Solvent | Vol. ratio org. solvent and stop | Added LiClO₄ in wt./vol.% | Film quality | Erasing behaviour |
|---|---|---|---|---|---|
| —C₈H₁₇ | " | 4:1 | 20 | +− | +− |
| —C₄H₉ | formamide | 1:4 | 0 | +− | +− |
| —C₄H₉ | " | 2:3 | 15 | +− | +− |
| —C₅H₁₁ | " | 1:4 | 0 | +− | +− |
| —C₅H₁₁ | " | 3:2 | 15 | +− | +− |
| —C₆H₁₃ | " | 1:4 | 0 | ++ | +− |
| —C₆H₁₃ | " | 4:1 | 10 | +− | +− |
| —C₇H₁₅ | " | 1:3 | 0 | ++ | +− |
| —C₇H₁₅ | " | 9:1 | 20 | +− | +− |
| —C₈H₁₇ | " | 2:3 | 0 | ++ | +− |
| —C₈H₁₇ | " | 9:1 | 20 | +− | +− |
| —C₄H₉ | N-methyl acetamide | 1:4 | 0 | +− | ++ |
| —C₄H₉ | " | 2:3 | 30 | +− | +− |
| —C₅H₁₁ | " | 1:4 | 0 | ++ | +− |
| —C₅H₁₁ | " | 3:2 | 30 | +− | +− |
| —C₆H₁₃ | " | 1:4 | 0 | ++ | +− |
| —C₆H₁₃ | " | 4:1 | 25 | ++ | +− |
| —C₇H₁₅ | " | 1:3 | 0 | ++ | ++ |
| —C₇H₁₅ | " | 4:1 | 20 | +− | ++ |
| —C₈H₁₇ | " | 2:3 | 0 | ++ | ++ |
| —C₈H₁₇ | " | 4:1 | 20 | +− | +− |

| Substituent R | Solvent | Vol. ratio org. solvent and stop | Added LiClO₄ in wt./vol.% | Film quality | Erasing behaviour |
|---|---|---|---|---|---|
| —C₄H₉ | tetrahydrofurann | 1:4 | 10 | +− | +− |
| —C₄H₉ | acetonitrile | 1:4 | 0 | +− | +− |
| —C₄H₉ | " | 1:3 | 25 | +− | +− |
| —C₅H₁₁ | " | 1:4 | 0 | ++ | +− |
| —C₅H₁₁ | " | 1:3 | 25 | ++ | +− |
| —C₆H₁₃ | " | 1:4 | 0 | ++ | +− |
| —C₄H₉ | acetic acid | 1:4 | 0 | ++ | ++ |
| —C₄H₉ | acetic acid $p^H 4.5$ | 2:3 | 60 | ++ | ++ |
| —C₅H₁₁ | " | 1:4 | 0 | +− | +− |
| —C₅H₁₁ | acetic acid $p^H 4.5$ | 2:3 | 20 | ++ | ++ |
| —C₄H₉ | sulfolan | 1:4 | 25 | +− | +− |
| —C₅H₁₁ | " | 1:4 | 0 | ++ | +− |
| —C₅H₁₁ | " | 2:3 | 20 | ++ | +− |
| —C₆H₁₃ | " | 1:4 | 0 | ++ | +− |
| —C₆H₁₃ | " | 1:1 | 20 | ++ | +− |
| —C₇H₁₅ | " | 1:4 | 0 | ++ | +− |
| —C₇H₁₅ | " | 3:2 | 25 | ++ | +− |
| —C₈H₁₇ | " | 2:1 | 30 | ++ | +− |
| —C₄H₉ | acetone | 1:4 | 5 | +− | +− |
| —C₄H₉ | " | 1:3 | 25 | +− | +− |
| —C₅H₁₁ | " | 1:4 | 0 | +− | +− |
| —C₅H₁₁ | " | 2:3 | 25 | +− | +− |
| —C₆H₁₃ | " | 1:3 | 5 | +− | +− |
| —C₆H₁₃ | " | 1:1 | 25 | +− | +− |
| —C₇H₁₅ | " | 1:3 | 0 | +− | +− |
| —C₇H₁₅ | " | 3:2 | 25 | +− | +− |
| —C₈H₁₇ | " | 2:3 | 0 | +− | +− |
| —C₈H₁₇ | " | 7:3 | 40 | +− | +− |

| Substituent R | Solvent | Vol. Ratio org. solvent and water | Added LiClO₄ in wt./vol.% | Film quality | Erasing behaviour |
|---|---|---|---|---|---|
| —C₄H₉ | H.M.P.A. | 1:4 | 5 | +− | +− |
| —C₅H₁₁ | " | 1:4 | 5 | +− | +− |
| —C₆H₁₃ | " | 1:4 | 0 | ++ | +− |
| —C₇H₁₅ | " | 1:3 | 0 | +− | +− |
| —C₈H₁₇ | " | 2:3 | 0 | +− | +− |
| —C₄H₉ | formic acid | 1:4 | 5 | +− | +− |
| —C₄H₉ | " | 2:3 | 25 | ++ | +− |
| —C₄H₉ | formic acid $p^H 4.5$ | 1:4 | 5 | +− | +− |
| —C₄H₉ | formic acid $p^H 4.5$ | 2:3 | 25 | ++ | +− |
| —C₅H₁₁ | formic acid | 1:4 | 0 | +− | +− |
| —C₅H₁₁ | " | 2:3 | 25 | ++ | +− |
| —C₅H₁₁ | formic acid $p^H 4.5$ | 1:4 | 0 | ++ | +− |
| —C₆H₁₃ | formic acid | 1:4 | 0 | +− | +− |
| —C₆H₁₃ | " | 2:3 | 20 | ++ | +− |
| —C₆H₁₃ | formic acid $p^H 4.5$ | 1:4 | 0 | ++ | ++ |

C. Viologen salt used corresponds to formula

TABLE -continued

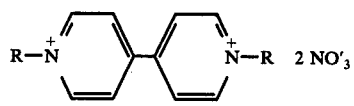

concentration 5 × 10⁻² molar

| Substituent R | Solvent | Vol. Ratio org. solvent and water | Added NaHO₃ in wt./vol% | Film quality | Erasing behaviour |
|---|---|---|---|---|---|
| C₅H₁₁ | formamide | 1:4 | 10 | ++ | ++ |
| C₅H₁₁ | " | 3:4 | 50 | ++ | ++ |
| C₇H₁₅ | " | 1:4 | 10 | ++ | ++ |
| C₇H₁₅ | " | 7:5 | 10 | ++ | ++ |
| C₈H₁₇ | " | 1:2 | 10 | ++ | ++ |
| C₈H₁₇ | " | 4:1 | 50 | ++ | ++ |
| C₅H₁₁ | dimethyl sulphoxide | 1:4 | 10 | ++ | ++ |
| C₅H₁₁ | " | 1:2 | 4 | ++ | ++ |
| C₇H₁₅ | " | 1:4 | 10 | ++ | ++ |
| C₇H₁₅ | " | 6:1 | 40 | ++ | ++ |
| C₇H₁₅ | sulfolan | 1:4 | 10 | ++ | ++ |
| C₇H₁₅ | " | 1:1 | 50 | ++ | ++ |
| C₈H₁₇ | " | 1:1 | 50 | ++ | ++ |

D. Viologen salt used corresponds to formula

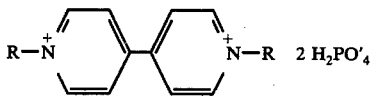

concentration 5 × 10⁻² molar

| Substituent R | Solvent | Vol. rat. org. solvent and water | Added NaH₂PO₄ | Film quality | Erasing behaviour |
|---|---|---|---|---|---|
| C₇H₁₅ | dimethylsulphoxide | 2:3 | 20% | ++ | ++ |
| C₇H₁₅ | " | 3:7 | 15% | ++ | ++ |
| C₇H₁₅ | formamide | 3:7 | 20% | ++ | ++ |
| C₇H₁₅ | acetic-acid | 3:7 | 25% | ++ | ++ |
| C₆H₁₃ | dimethylsulphoxide | 2:3 | 20% | ++ | ++ |

E. Added viologen salt corresponds to formula

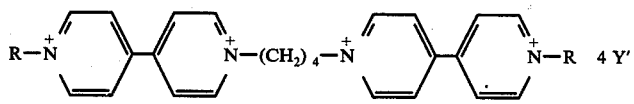

concentration 0.025 molar

| viologen salt R | Y | Solvent | Vol. ratio org. solvent and water | Added salt | Film quality | Erasing Behaviour |
|---|---|---|---|---|---|---|
| benzyl | ClO₄ | dimethyl sulphoxide | 2:3 | 0 | ++ | ++ |
| ethyl | BF₄ | " | 1:3 | 0 | ++ | ++ |
| ethyl | BF₄ | " | 1:1 | 20 wt./vol % NaBF₄ | ++ | ++ |
| benzyl | ClO₄ | dimethyl formamide | 1:3 | 0 | +− | +− |
| benzyl | ClO₄ | " | 1:1 | 10 wt./vol % LiClO₄ | +− | +− |
| benzyl | ClO₄ | " | 7:3 | 25 wt./vol % LiClO₄ | +− | +− |
| benzyl | ClO₄ | N-methyl formamide | 1:1 | 0 | +− | +− |
| benzyl | ClO₄ | " | 4:1 | 10 wt./vol % LiClO₄ | +− | +− |
| benzyl | ClO₄ | N-methyl acetamide | 1:1 | 0 | +− | +− |
| benzyl | ClO₄ | " | 7:3 | 10 wt./vol % LiClO₄ | +− | +− |
| benzyl | ClO₄ | formic acid | 1:1 | 0 | ++ | ++ |
| benzyl | ClO₄ | acetic acid | 2:3 | 0 | ++ | +− |
| ethyl | H₂PO₄ | dimethyl sulphoxide | 3:7 | 25 wt.% NaH₂PO₄ | ++ | ++ |
| ethyl | H₂PO₄ | formamide | 3:7 | 25 wt.% NaH₂PO₄ | ++ | ++ |

TABLE -continued

| ethyl org. solvent | H$_2$PO$_4$' acetic acid Vol. ratio org. solvent and water | 3:7 added LiClO$_4$ in wt.$^4$/vol.% | 25 wt.% Film singing quality | ++ Eration of behaviour | ++ concentration viologen salt in g/l |
|---|---|---|---|---|---|
| dimethyl sulphoxide | 7:3 | 0 | ++ | +− | 25 |
| dimethyl formamide | 3:2 | 5 | ++ | +− | 25 |
| dimethyl acetamide | 1:1 | 10 | ++ | +− | 10 |
| N-methyl formamide | 3:2 | 0 | ++ | +− | 25 |
| formamide | 3:2 | 5 | ++ | +− | 25 |
| N-methyl acetamide | 1:1 | 5 | ++ | +− | 10 |
| tetrahydrofuran | 1:1 | 5 | ++ | +− | 10 |
| acetone | 3:2 | 5 | ++ | +− | 25 |
| sulfolan | 1:1 | 5 | ++ | +− | 25 |
| acetonitrile | 1:1 | 5 | ++ | +− | 25 |
| propylene carbonate | 9:1 | 40 | ++ | +− | 25 |
| acetic acid | 1:1 | 0 | ++ | +− | 25 |
| formic acid | 1:1 | 0 | ++ | +− | 25 |

EXAMPLE 2

In FIG. 1 the crystallization temperature of a cell medium used in a picture display cell according to the invention is shown in accordance with the quantity of organic solvent.

The cell medium employed contains a solution of tetramethylene-bis[4(1-ethylpyridin-4-yl)pyridinium]-tetraperchlorate (0.025 mol/l) in a mixture of water and dimethyl sulphoxide. Dissolved in the cell medium is furthermore 1 g of NaNO$_3$ per 10 ml. As will be noted from the graph that when a cell medium is used which contains 40% by volume of DMSO (so 60% by volume of H$_2$O), a crystallization temperature lower than minus 30° C. was reached.

EXAMPLE 3

Figure 1:
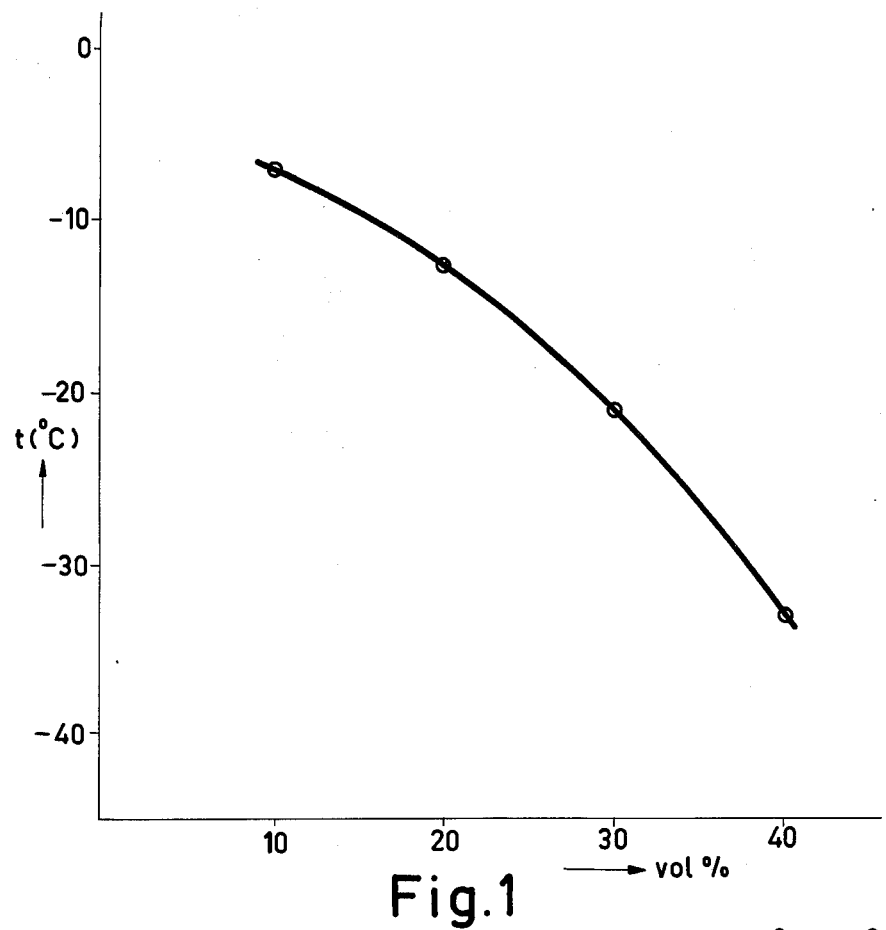
Figure 2:
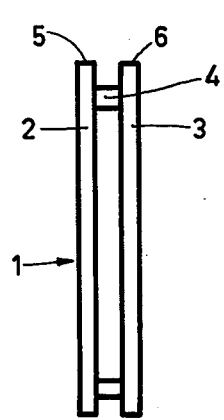
FIG. 2 is a cross-sectional view of a picture display cell according to the invention.
Figure 3:
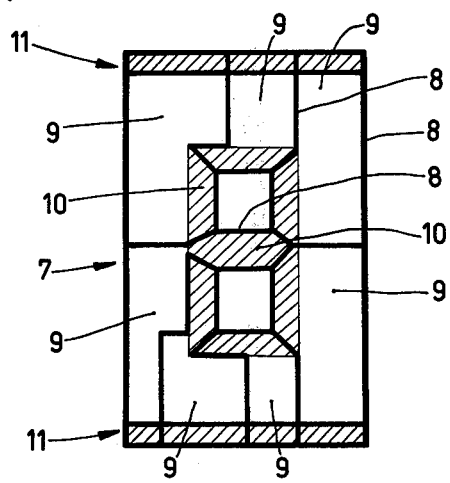
FIG. 3 is a plan view of the picture electrode used in the cell according to the invention.

Reference numeral 1 in FIG. 2 denotes a housing which is formed by two parallel glass plates 2 and 3 which are kept spaced apart at a mutual distance of a few millimeters by a spacing member 4 which is manufactured from glass or polythene. The housing is filled with a cell medium as is stated in Example 1. Edges 5 and 6 of plates 2 and 3, respectively, project beyond the spacing member 4 and thus provide easy connection possibilities for an electric switching system with which the cell is operated. The plates 2 and 3 are provided on the inside with a layer of transparent and conductive SnO$_2$ having a resistance per square of 10 Ohm. The SnO$_2$ provided on the plate 2 forms a pattern as is shown in FIG. 3 in such manner that seven picture electrodes are formed. Plate 3 is covered throughout the inner surface with a continuous layer of SnO$_2$ which forms the counter electrode. For operating the cell a circuit is used which compares the voltage between the switched-on picture electrodes and a measuring electrode with a given signal voltage and adapts the current through the counter electrode and the picture electrode in such manner that the measured voltage is equal to said signal voltage.

FIG. 3 shows a picture electrode pattern which is manufactured as follows. A glass plate 7 was provided over the whole surface with a transparent and conductive layer of SnO$_2$ of which the parts 8 were subsequently etched away as is shown in heavy lines in FIG. 3. As a result of this seven mutually insulated SnO$_2$ faces 9 were formed which were then coated partly with a non-conductive coating of, for example, a photoresist. The remaining non-covered parts 10 are shaded in FIG. 3. As is shown in FIG. 3 the edges 11 which correspond to edges 5 of FIG. 2 are not covered with an insulating coating so that the desired electric connections can be provided hereon.

What is claimed is:

1. An image display cell with a memory effect comprising a housing having a transparent wall part and containing a reversible reduceable redox material dissolved in an electro-chemically inert liquid which is in contact with at least two inert electrodes provided in said housing, characterized in that the electrochemically inert liquid is a mixture of water and an electrochemically inert solvent in which the redox material is a 4,4'-bipyridinium compound corresponding to the formula I

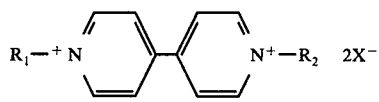

wherein R$_1$ and R$_2$ each represent an alkyl group having 4–8 carbon atoms and X$^-$ is a ClO$_4$', NO$_3$', H$_2$PO$_4$' or BF$_4$' group, or a bipyridinium dimeric compound which corresponds to the formula II

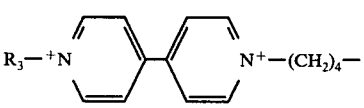

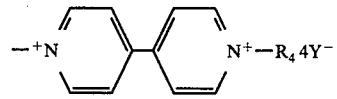

wherein R$_3$ and R$_4$ each represent an alkyl group having 1–4 carbon atoms or a benzyl group which may be substituted with an electrochemically inert substituent, and Y$^-$ is a ClO$_4$', BF$_4$', H$_2$PO$_4$' or PF$_6$' group, or a bipyridinium polymeric compound which is obtained by reacting 4,4'-bipyridyl and α,ω-dibromobutane in a polar aprotic solvent and then replacing the bromide anion by a $ClO_4'$ ion, $H_2PO_4'$ ion or $BF_4'$ ion the combination of said mixture of water and solvent and redox material being such that said redox material when in reduced form is colored and insoluble in said mixture of water and solvent.

2. An image display cell as claimed in claim 1, characterized in that the electrochemically inert liquid contains from 10 to 90% by volume of an organic solvent is selected from the group consisting of dimethyl sulphoxide, dimethyl formamide, dimethyl acetamide, N-alkyl formamide, formamide, N-alkyl acetamide, hexamethylene phosphoramide, tetrahydrofuran, acetonitrile, lower aliphatic carboxylic acids, alkylene carbonate, sulfolan and acetone and for the remainder water.

3. An image display cell as claimed in claim 2, characterized in that the electrochemically inert liquid also comprises a salt dissolved therein whose anion is identical to the anion of the reversible reduceable redox material present in the display cell.

4. An image display cell as claimed in claim claim 2, characterized in that a small quantity of a bromide is also dissolved in the electrochemically inert liquid.

5. An image display cell, of claim 1 characterized in that the reversible reduceable redox material is a compound which corresponds to the formula I, wherein $R_1$ and $R_2$ each represent an alkyl group having 5–8 carbon atoms and $X^-$ is a $H_2PO_4'$ or $NO_3'$ group, or corresponds to the formula II wherein $R_3$ and $R_4$ are an alkyl group having 1–4 carbon atoms and $Y^-$ is a $ClO_4'$, $BF_4'$, $H_2PO_4'$ or $PF_6'$ group.

6. An image display cell, of claim 1 characterized in that the electrochemically inert liquid contains a salt for increasing the electric conductivity.

* * * * *